United States Patent [19]
Kasztelan et al.

[11] Patent Number: 6,037,300
[45] Date of Patent: Mar. 14, 2000

[54] CATALYST CONTAINING BORON AND SILICON AND ITS USE FOR HYDROTREATING HYDROCARBON FEEDS

[75] Inventors: Slavik Kasztelan, Rueil Malmaison; Samuel Mignard, Chatou; Virginie Harle, Rueil Malmaison; Nathalie George-Marchal, Paris, all of France

[73] Assignee: Institut Francais du Petrole, Cedex, France

[21] Appl. No.: 08/992,084

[22] Filed: Dec. 17, 1997

[30] Foreign Application Priority Data

Dec. 17, 1996 [FR] France ................................. 96 15622

[51] Int. Cl.[7] .......................... B01J 21/02; B01J 27/188; B01J 27/132; B01J 23/00

[52] U.S. Cl. .......................... 502/204; 502/207; 502/210; 502/213; 502/214; 502/228; 502/229; 502/232; 502/254; 502/257; 502/258; 502/313

[58] Field of Search .................... 502/204, 207, 502/210, 213, 214, 224, 228, 229, 230, 232, 236, 239, 238, 254, 257, 258, 313, 314, 315

[56] References Cited

U.S. PATENT DOCUMENTS

| | | | |
|---|---|---|---|
| 3,453,219 | 7/1969 | O'Hara | 252/432 |
| 3,637,525 | 1/1972 | O'Hara | 252/432 |
| 3,666,685 | 5/1972 | O'Hara | 252/432 |
| 4,018,709 | 4/1977 | Barone et al. | 252/435 |
| 4,434,047 | 2/1984 | Hensley, Jr. et al. | 208/111 |
| 4,724,226 | 2/1988 | Cheng et al. | 502/204 |
| 5,085,763 | 2/1992 | Dufresne et al. | 208/120 |
| 5,214,017 | 5/1993 | Angstadt et al. | 502/204 |
| 5,364,825 | 11/1994 | Neumann et al. | 502/311 |
| 5,389,592 | 2/1995 | Weissman et al. | 502/25 |
| 5,556,824 | 9/1996 | Sudhakar et al. | 502/202 |
| 5,609,750 | 3/1997 | Nat et al. | 502/122 |
| 5,808,143 | 9/1998 | Karrer et al. | 562/407 |

FOREIGN PATENT DOCUMENTS

| | | | |
|---|---|---|---|
| 1024922 | 1/1978 | Canada | 196/54 |
| 517300 | 5/1992 | European Pat. Off. | B01J 23/85 |
| 2092667 | 1/1972 | France | C10G 23/00 |
| 2347097 | 11/1977 | France | B01J 23/46 |

*Primary Examiner*—Mark L. Bell
*Assistant Examiner*—Patricia L. Hailey
*Attorney, Agent, or Firm*—Millen, White, Zelano, & Branigan, P.C.

[57] ABSTRACT

The invention concerns a hydrotreated catalyst comprising a support, at least one group VI metal, silicon, boron, optionally at least one metal from group VIII of the periodic table, optionally phosphorus, and optionally a halogen, also a particular preparation of this catalyst. The invention also concerns the use of the catalyst for hydrotreating hydrocarbon feeds.

14 Claims, No Drawings

CATALYST CONTAINING BORON AND SILICON AND ITS USE FOR HYDROTREATING HYDROCARBON FEEDS

SUMMARY OF THE INVENTION

The present invention concerns a catalyst for hydrorefining hydrocarbon feeds, the catalyst comprising at least one metal from group VIB (group 6 in the new notation for the periodic table: "Handbook of Chemistry and Physics, 76$^{th}$ edition, 1995–1996, inside front cover), preferably molybdenum and tungsten, and optionally at least one metal from group VIII (groups 8, 9 and 10) of that periodic table, preferably cobalt and nickel, associated with a porous matrix which can be either a porous amorphous or a low crystallinity matrix (and generally an oxide). The catalyst is characterized in that it comprises silicon, boron, optionally phosphorus, and optionally at least one element from group VIIA (group 17, halogens), in particular fluorine.

The present invention also concerns processes for preparing the catalyst, also its use for hydrotreating hydrocarbon feeds such as petroleum cuts, cuts originating from coal comprising reactions such as hydrogenation, hydrodenitrogenation, hydrodeoxygenation, hydrodesulfuration, and hydrodemetallisation of hydrocarbon feeds containing aromatic compounds and/or olefinic compounds and/or naphthenic compounds and/or paraffinic compounds, the feeds possibly containing metals and/or nitrogen and/or oxygen and/or sulfur.

Hydrotreated is becoming more and more important in refining due to the increasing necessity of reducing the quantity of sulfur in petroleum cuts and converting heavy fractions to lighter fractions which can be upgraded to fuels. This results partly from an increasing demand for fuels which necessitates conversion of imported crude oils which are becoming richer in heavy fractions and heteroatoms, among them nitrogen and sulfur, and partly due to the regulations imposed by various countries on commercial fuels as regards the concentrations of sulfur and aromatics. This upgrading implies a relatively large reduction in the molecular weight of the heavy constituents which can be achieved, for example, by means of cracking reactions.

Current catalytic hydrorefining processes use catalysts which can promote the principal reactions used to upgrade heavy cuts, in particular aromatic ring hydrogenation (HAR), hydrodesulfuration (HDS), hydrodenitrogenation (HDN) and other hydroeliminations. Hydrorefining is used to treat feeds such as gasolines, gas oils, vacuum gas oils, and atmospheric or vacuum residues, deasphalted or otherwise. As an example, it is always used for pre-treating feeds from cracking and catalytic hydrocracking processes. Heterocyclic nitrogen-containing compounds contained in heavy fractions act as poisons with very high toxicity for cracking or hydrocracking catalysts. As a result, denitrogenation of catalytic hydrocracking feeds constitutes one of the possible ways of improving the overall yield from such processes, and reducing the nitrogen content in feeds by a maximum amount before cracking them is thus desirable. At least one hydrorefining step is normally integrated into every known process for upgrading heavy petroleum cuts.

It is thus important to increase the hydrotreated activity of hydrotreated catalysts. One means consists of acidifying the matrix without poisoning the activity of the hydrogenating phase based on a transition metal.

The invention thus concerns a hydrotreated catalyst for hydrocarbon feeds. The catalyst contains at least one metal selected from group VIB of the periodic table, such as chromium, molybdenum and tungsten, preferably molybdenum and tungsten, and optionally at least one metal selected from group VIII of the periodic table, such as iron, cobalt, nickel, ruthenium, rhodium, palladium, iridium, osmium or platinum. The catalyst comprises at least one support selected from the group formed by amorphous supports and supports with low crystallinity. The catalyst is characterized in that it comprises boron, silicon, optionally phosphorus and optionally an element from group VIIA, preferably fluorine.

The activity of the catalyst as regards hydrogenation of aromatic hydrocarbons and for hydrodenitrogenation and hydrodesulfuration is higher than known prior art catalytic formulations. Without wishing to be committed to a particular theory, it appears that this particularly high activity in the catalysts of the present invention is due to reinforcement of the acidity of the catalyst by the joint presence of boron and silicon in the matrix which causes an improvement in the hydrogenating, hydrodesulfurising and hydrodenitrogenating properties and improves the activity compared with the catalysts which are normally used in hydrotreated reactions.

The catalyst of the present invention generally comprises at least one metal selected from the following groups and in the following amounts, in % by weight with respect to the total catalyst mass:

3% to 60%, preferably 3% to 45%, and more preferably 3% to 30%, of at least one group VIB metal; and at most 30%, preferably 0.1% to 25%, more preferably 0.1 % to 20%, of at least one group VIII metal;

the complement of the catalyst further comprising at least one support selected from the group constituted by amorphous matrices and matrices of low crystallinity;

the catalyst being characterized in that it further comprises:

0.1% to 20%, preferably 0.1% to 15%, more preferably 0.1% to 10%, of boron;

0.1% to 20%, preferably 0.1% to 15%, more preferably 0.1% to 10%, of silicon. Contents of more than 1.6% (in particular 1.6–10%) are often advantageous;

and optionally:

0 to 20%, preferably 0.1% to 20%, more preferably 0.1% to 15%, still more preferably 0. 1% to 10%, of phosphorus;

and optionally again:

0 to 20%, preferably 0.1% to 20%, more preferably 0.1% to 15%, still more preferably 0.1% to 10%, of at least one element selected from group VIIA (halogen), preferably fluorine.

The group VIB and group VIII metals of the catalyst of the present invention can be totally or partially present in the form of the metal and/or oxide and/or sulfide.

The catalysts of the invention can be prepared using any suitable method. Silicon and boron are preferably introduced into the catalyst which already comprises the support and the group VIB and group VIII metal(s). Preferably, a catalyst, for example a conventional hydrotreated catalyst, of the NiMo or NiMoP on alumina type or the CoMo or CoMoP on alumina type is impregnated with an aqueous boron solution then with an aqueous silicon solution (or vice versa, a silica solution then a boron solution) or it is impregnated with a common aqueous solution of boron and silicon.

More particularly, a process for the preparation of the catalyst of the present invention comprises the following steps:

a) drying and weighing a solid, hereinafter termed the precursor, comprising at least one of the following compounds: a porous amorphous and/or crystalline matrix, at least one group VIB element, and optionally at least one group VIII element, and optionally phosphorus, the whole solid preferably being formed;

b) impregnating the solid precursor defined in step a) with an aqueous solution containing boron and/or silicon and optionally at least one group VIIA element, preferably F;

c) leaving the wet solid in a moist atmosphere at a temperature which is in the range 10° C. to 80° C.;

d) drying the wet solid obtained from step b) at a temperature which is in the range 60° C. to 150° C.;

e) calcining the solid obtained in step c) at a temperature which is in the range 150° C. to 800° C.

The precursor defined in step a) above can be prepared using conventional methods which are known to the skilled person.

Step b) requires the use of an aqueous solution containing boron and/or silicon and thus is different to conventional methods for depositing B and/or Si known to the skilled person. In a preferred method, an aqueous solution of at least one boron salt such as ammonium biborate or ammonium pentaborate is prepared in an alkaline medium and in the presence of hydrogen peroxide and a silicone type silicon compound is introduced into the solution. Dry impregnation is commenced, in which the pore volume of the precursor is filled with the solution containing B and Si. This method of depositing B and Si is an improvement over the conventional method using an alcoholic solution of boric acid or a solution of ethyl orthosilicate in alcohol.

The B and Si, optional P and optional element selected from group VIIA halide ions, preferably F, can be introduced into the catalyst at various stages of the preparation and in a variety of ways.

The matrix is preferably impregnated using the "dry" impregnation method which is well known to the skilled person. Impregnation can be carried out in a single step using a solution containing all of the constituent elements of the finished catalyst.

P, B, Si and the element selected from halide ions of group VIIA can be introduced using one or more impregnation operations using an excess of solution over the calcined precursor.

Thus, for example, in the preferred case where the precursor is a nickel-molybdenum type catalyst supported on alumina, the precursor can be impregnated with an aqueous solution of ammonium biborate and Rhodorsil E1P silicone from Rhône-Poulenc, dried at 80° C., for example, then impregnated with an ammonium fluoride solution, dried at 80° C. for example, and calcined, preferably in air in a traversed bed, for example, at 500° C. for 4 hours.

Other impregnation sequences can be used to obtain the catalyst of the present invention.

Thus the solution containing silicon can first be impregnated, then dried, calcined then impregnated with the solution containing boron, dried then finally calcined.

The solution containing boron can also be first impregnated, then dried, calcined then impregnated with the solution containing silicon, dried and then finally calcined.

The precursor can first be impregnated with a solution containing phosphorus, then dried, calcined and the solid obtained impregnated with the solution containing boron, dried, calcined and impregnated with the solution containing silicon, dried and then finally calcined.

When the metals are introduced in several impregnation steps for the corresponding precursor salts, an intermediate catalyst drying step is generally carried out at a temperature which is generally in the range 60° C. to 250° C.

The preferred phosphorus source is orthophosphoric acid $H_3PO_4$, but its salts and esters such as ammonium phosphates are also suitable. Phosphorus can, for example, be introduced in the form of a mixture of phosphoric acid and a basic organic compound containing nitrogen such as ammonia, primary and secondary amines, cyclic amines, compounds of the pyridine family and quinolines, and compounds of the pyrrole family.

A variety of silicon sources can be used. Thus ethyl orthosilicate $Si(OEt)_4$, siloxanes, halogenated silicates such as ammonium fluorosilicate $(NH_4)_2SiF_6$ or sodium fluorosilicate $Na_2SiF_6$ can be used. Silicomolybdic acid and its salts, or silicotungstic acid and its salts can also advantageously be used. Silicon can be added, for example, by impregnating with ethyl silicate in solution in a water/alcohol solution.

The boron source can be boric acid, preferably orthoboric acid $H_3BO_3$, ammonium biborate or pentaborate, boron oxide or boric esters. Boron can be introduced, for example, in a solution of boric acid in a water/alcohol mixture.

Sources of group VIIA elements which can be used are known to the skilled person. As an example, fluoride ions can be introduced in the form of hydrofluoric acid or its salts. These salts are formed with alkali metals or ammonium salts or with an organic compound. In the latter case, the salt is advantageously formed in the reaction mixture by reaction between the organic compound and hydrofluoric acid. It is also possible to use hydrolysable compounds which can liberate fluoride ions in the water, such as ammonium fluorosilicate $(NH_4)_2SiF_6$, silicon tetrafluoride $SiF_4$ or sodium tetrafluoride $Na_2SiF_6$. Fluorine can be introduced, for example by impregnating with an aqueous solution of hydrofluoric acid or ammonium fluoride.

The sources of group VI elements which can be used are known to the skilled person. As an example, among the sources of molybdenum and tungsten, oxides and hydroxides can be used, molybdic acids and tungstic acids and their salts, in particular ammonium salts such as ammonium molybdate, ammonium heptamolybdate, ammonium tungstate, phosphomolybdic acid, or phosphotungstic acid and their salts. Ammonium salts and oxides are preferably used, such as ammonium molybdate, ammonium heptamolybdate and ammonium tungstate.

The catalyst of the present invention may contain a group VIII element such as iron, cobalt or nickel. Combinations of the following metals can advantageously be used: nickel-molybdenum, cobalt-molybdenum, iron-molybdenum, iron-tungsten, nickel-tungsten, and cobalt-tungsten. Preferred combinations are nickel-molybdenum and cobalt-molybdenum. Combinations of three metals can also be used, for example nickel-cobalt-molybdenum.

Sources of the group III element which can be used are known to the skilled person. By way of example, nitrates, sulphates, phosphates, halides, for example chlorides, bromides and fluorides, and carboxylates, for example acetates and carbonates, can be used.

The catalyst of the present invention thus also comprises at least one porous mineral matrix which is normally amorphous or of low crystallinity. This matrix is normally selected from the group formed by alumina, silica, silica-aluminas, magnesia, titanium oxide or zirconium oxide, or a mixture of at least two of the oxides cited above. Aluminates can also be used. Matrices containing alumina are preferred, in all the forms which are known to the skilled person, for example gamma alumina.

Mixtures of alumina and silica, mixtures of alumina and silica-alumina and mixtures of alumina and boron oxide can advantageously also be used.

Mixtures of alumina and clay and silica-alumina and clay mixtures can advantageously also be used.

Impregnation of molybdenum can be facilitated by adding phosphoric acid to solutions of ammonium paramolybdate, which thus also introduces phosphorus and promotes catalytic activity. Other phosphorus compounds can be used, as is well known to the skilled person.

The catalysts obtained in the present invention are formed into grains with different shapes and dimensions. They are generally used in the form of extrudates which are cylindrical or poly-lobed, for example bi-lobed, ti-lobed, or poly-lobed with a straight or twisted shape, but can optionally be manufactured and used in the form of loose packed powder, tablets, rings, spherules, or wheels. They have a specific surface area, measured by nitrogen adsorption using the BET method (Brunauer, Emmett, Teller, J. Am. Chem. Soc., vol. 60, 309–316 (1938)), which is in the range 50 $m^2/g$ to 600 $m^2/g$, a pore volume, measured using a mercury porosimeter, which is in the range 0.2 $cm^3/g$ to 1.5 $cm^3/g$, and a pore size distribution which can be monomodal, bimodal or polymodal.

The catalysts obtained in the present invention are used for hydrotreating hydrocarbon feeds such as petroleum cuts or cuts from coal comprising reactions such as hydrogenation, hydrodenitrogenation, hydrodeoxygenation or hydrodesulfuration of hydrocarbon feeds containing aromatic and/or olefinic and/or naphthenic and/or paraffinic compounds, the feeds possibly containing metals and/or nitrogen and/or oxygen and/or sulfur. For these uses, the catalysts of the present invention exhibit improved activity over the prior art.

The feeds used in the process are gasolines, gas oils, vacuum gas oils, atmospheric residues, vacuum residues, atmospheric distillates, vacuum distillates, heavy fuels, oils, waxes and paraffins, spent oils, deasphalted residues or crudes, feeds originating from thermal or catalytic conversion processes, and mixtures thereof. They contain heteroatoms such as sulfur, oxygen and nitrogen and at least one metal.

The hydrotreated conditions, such as temperature, pressure, hydrogen recycle rate, and hourly space velocity, can be very different depending on the nature of the feed, the quality of the desired products and the facilities available to the refiner. The temperature is generally more than 200° C., often in the range 250° C. to 480° C. The pressure is more than 0.05 MPa, normally more than 1 MPa. The hydrogen recycle rate is a minimum of 50 and normally in the range 80 to 5000 normal liters of hydrogen per liter of feed. The hourly space velocity is generally in the range 0.1 to 20 volumes of feed per volume of catalyst per hour.

The catalysts of the present invention preferably undergo a sulfurisation treatment which can at least partially transform the metallic species into the sulfide before bringing them into contact with the feed to be treated. This activation treatment using sulfurisation is well known to the skilled person and can be carried out using any method which has been described in the literature.

A conventional sulfurisation method which is well known to the skilled person consists of heating the mixture of solids in a stream of hydrogen and hydrogen sulfide or in a stream of nitrogen and hydrogen sulfide to a temperature which is in the range 150° C. to 800° C., preferably in the range 250° C. to 600° C., generally in a traversed bed reaction zone.

Results which are of interest to the refiner are the HDS, HDN and HDM and conversion activities. Specific targets must be achieved under conditions which are compatible with economic reality. Thus the refiner will seek to reduce the temperature, pressure and hydrogen recycle rate and maximise the hourly space velocity. It is known that the activity can be increased by increasing the temperature, but this is often to the detriment of catalyst stability. Stability or service life improves with an increase in pressure or hydrogen recycle rate, but this is to the detriment of process economy.

Gasoline Hydrodesulfuration

The catalyst of the present invention can advantageously be used for hydrodesulfuration of gasoline type cuts to reduce the sulfur content and satisfy regulations regarding the sulfur content of gasolines. Treated feeds have initial boiling points of at least 25° C., preferably at least 30° C., and more advantageously the boiling range of the cut is between 30° C. and 280° C.

In this hydrotreated mode, often termed gasoline hydrodesulfuration, pretreatment of a catalytic reforming feed or hydrodesulfuration of a fluid catalytic cracking gasoline with the catalyst of the invention is carried out at a temperature which is generally 200° C. or more, generally at most 400° C. The pressure is generally more than 0.1 MPa, preferably more than 0.2 MPa. The quantity of hydrogen is a minimum of 50 normal liters of hydrogen per liter of feed, normally between 50 and 1000 normal liters of hydrogen per liter of feed. The hourly space velocity is generally in the range 1 to 20 $h^{-1}$, preferably 2–20 $h^{-1}$. Under these conditions, the catalysts of the present invention containing cobalt, molybdenum, boron and silicon exhibit improved activity for hydrodesulfuration over catalysts containing cobalt and molybdenum but not containing the two elements boron and silicon, as will be demonstrated in Example 19.

Gas Oil Desulfuration

The catalyst of the present invention can advantageously be used for hydrodesulfuration of gas oil type cuts to reduce the sulfur content and satisfy regulations regarding sulfur content. Treated hydrocarbon feeds have initial boiling points of at least 80° C., and more advantageously the boiling range of the cut is between 150° C. and 480° C.

In this hydrotreated mode, often termed gas oil hydrodesulfuration, the catalyst of the invention is used a temperature which is generally 250° C. or more, generally at most 450° C., and usually in the range 280° C. to 430° C. The pressure is generally more than 0.2 MPa, preferably more than 0.5 MPa. The quantity of hydrogen is a minimum of 50 normal liters of hydrogen per liter of feed, normally between 80 and 1000 normal liters of hydrogen per liter of feed. The hourly space velocity is generally in the range 0.1 to 20 $h^{-1}$, preferably 0.5–15 $h^{-1}$. Under these conditions, the catalysts of the present invention containing cobalt, molybdenum, boron and silicon exhibit improved hydrodesulfuration activity over catalysts containing cobalt and molybdenum but not containing the two elements boron and silicon, as will be demonstrated in Example 15.

Hydrogenation of Aromatic Compounds in Gas Oils

The catalyst of the present invention can advantageously be used for hydrogenation of aromatic compounds in a variety of hydrocarbon cuts with low sulfur contents, which may, for example, have already been hydrodesulfurised. Treated feeds have initial boiling points of over 80° C. and below 580° C. They contain 1 to 2000 ppm by weight of sulfur, preferably 2 to 1500 ppm S. This type of hydrotreated is of particular importance in reducing the aromatic compound content in light and heavy gas oils.

In this hydrotreated mode, the catalyst of the invention is used at a temperature which is generally 280° C. or more, generally at most 420° C., and usually in the range 300° C. to 400° C. The pressure is generally more than 1 MPa, preferably more than 3 MPa. The quantity of hydrogen is a minimum of 100 normal liters of hydrogen per liter of feed, normally between 200 and 3000 normal liters of hydrogen per liter of feed. The hourly space velocity is generally in the range 0.1 to 10 $h^{-1}$, preferably 0.2–5 $h^{-1}$. Under these conditions, catalysts of the present invention containing molybdenum, nickel, boron and silicon exhibit improved activity for aromatic compound hydrogenation over catalysts not containing the two elements boron and silicon, as will be demonstrated in Example 16.

Hydrotreated of Vacuum Distillates

The catalyst of the present invention can advantageously be used for hydrotreated of vacuum distillate type cuts containing large quantities of sulfur and nitrogen to reduce the sulfur content and in particular to reduce the nitrogen content. Treated hydrocarbon feeds have initial boiling points of at least 250° C., preferably at least 300° C. and more advantageously the boiling range of the cut is between 330° C. and 650° C. This type of hydrotreated is of particular importance in the pretreatment of feeds intended for a hydrocracker using one or more zeolitic catalysts, feeds for fluid catalytic cracking, and to hydrorefme oil cuts.

In this hydrotreated mode, often termed pretreatment of hydrocracking feeds, pretreatment of FCC feeds or oil hydrorefining, the catalyst of the invention is used a temperature which is generally 300° C. or more, generally at most 450° C., and usually in the range 340° C. to 440° C. The pressure is generally more than 2 MPa, preferably more than 5 MPa. The quantity of hydrogen is a minimum of 100 normal liters of hydrogen per liter of feed, normally between 200 and 3000 normal liters of hydrogen per liter of feed. The hourly space velocity is generally in the range 0.1 to 5 $h^{-1}$, preferably 0.2–4 $h^{-1}$. Under these conditions, catalysts of the present invention containing nickel, molybdenum, boron and silicon exhibit improved hydrodesulfuration and hydrodenitrogenation activity over catalysts containing molybdenum and nickel but not containing the two elements boron and silicon, as will be demonstrated in Example 9.

Partial Hydrocracking

The catalyst of the present invention can advantageously be used for partial hydrocracking of a variety of hydrocarbon cuts, for example vacuum distillates which contain large quantities of sulfur and nitrogen. Treated hydrocarbon feeds have initial boiling points of at least 150° C., preferably at least 300° C. and more advantageously the boiling range of the cut is between 330° C. and 650° C.

In this partial hydrocracking mode, also sometimes known as mild hydrocracking, the level of conversion is below 55%. The catalyst of the invention is thus used a temperature which is generally 350° C. or more, generally at most 480° C., and usually in the range 360° C. to 460° C., preferably 360–450° C. The pressure is generally more than 2 MPa, preferably more than 5 MPa. The quantity of hydrogen is a minimum of 100 normal liters of hydrogen per liter of feed, normally between 200 and 3000 normal liters of hydrogen per liter of feed. The hourly space velocity is generally in the range 0.1 to 5 $h^{-1}$, preferably 0.1–4 $h^{-1}$. Under these conditions, catalysts of the present invention containing boron and silicon exhibit improved hydrodesulfuration and hydrodenitrogenation conversion activity over catalysts not containing the two elements boron and silicon, as will be demonstrated in Example 17.

Hydrocracking

The catalyst of the present invention can also advantageously be used for hydrocracking a variety of hydrocarbon cuts, for example vacuum distillates which contain large quantities of sulfur and nitrogen. Treated hydrocarbon feeds have initial boiling points of at least 150° C., preferably at least 300° C. and more advantageously the boiling range of the cut is between 330° C. and 650° C.

In this hydrocracking mode, the level of conversion is over 55%. The operating conditions are generally a temperature of 350–460° C., preferably 360–450° C., a pressure of over 5 MPa, preferably over 8 MPa, an hourly space velocity of 0.1 to 5 $h^{-1}$, preferably 0.1–4 $h^{-1}$, with a quantity of hydrogen of at least 100 Nl/l of feed, preferably 200–3000 NL/l of feed.

Under these conditions, catalysts of the present invention containing molybdenum, nickel, boron and silicon exhibit improved conversion activity and an equivalent selectivity towards middle distillates compared with catalysts which do not contain the two elements boron and silicon, as will be demonstrated in Example 18.

EXAMPLES

The following examples illustrate the present invention without in any way limiting its scope.

Example 1

Preparation of an Alumina Support Forming Part of the Composition of the Catalysts of the Invention We produced a large quantity of an alumina based support so that the catalysts described below could be prepared from the same formed support. We used a matrix composed of ultrafine tabular boehmite or alumina gel sold by Condéa Chemie GmbH under the trade name SB3. This gel was mixed with an aqueous solution containing 66% nitric acid (7% by weight of acid per gram of dry gel) then ground for 15 minutes. Following mixing, the paste obtained was passed through a die with cylindrical orifices with a diameter of 1.3 mm. The extrudates were dried overnight at 120° C. then calcined at 550° C. for 2 hours in moist air containing 7.5% by volume of water. 1.2 mm diameter cylindrical extrudates were obtained which had a specific surface area of 243 $m^2/g$, a pore volume of 0.61 $cm^3/g$ and a monomodal pore size distribution centered on 10 nm. Analysis of the matrix by X ray diffraction revealed that this was composed only of cubic gamma alumina of low crystallinity.

Example 2

Preparation of NiMo/Alumina Catalyst Precursor

We dry impregnated the extruded support of Example 1 with an aqueous solution comprising salts of molybdenum and nickel. The molybdenum salt was ammonium heptamolybdate $Mo_7O_{24}(NH_4)_6.4H_2O$, and the nickel salt was nickel nitrate $Ni(NO_3)_2.6H_2O$. After ageing at ambient temperature in a water-saturated atmosphere, the impregnated extrudates were dried overnight at 120° C. then calcined at 550° C. for 2 hours in dry air. The final molybdenum trioxide content was 14.5% by weight, which corresponded to 0.1 moles of elemental molybdenum per 100 g of finished catalyst. The final nickel oxide NiO content was 2.8% by weight which corresponded to 0.037 moles of elemental nickel per 100 g of finished catalyst. Catalyst A obtained, the characteristics of which are shown in Table 1, was representative of industrial catalysts.

Example 3
Preparation of NiMoP/Alumina Catalyst Precursor

We dry impregnated the extruded support of Example 1 with an aqueous solution containing the same salts as the solution used to prepare catalyst A of Example 2, but to which phosphoric acid $H_3PO_4$ had been added. The same steps of ageing, drying and calcining as those used to prepare catalyst A of Example 2 were used. The final molybdenum trioxide content was 14.5% by weight, which corresponded to 0.1 moles of elemental molybdenum per 100 g of finished catalyst. The final nickel oxide content was 2.80% by weight which corresponded to 0.037 moles of elemental nickel per 100 g of finished catalyst. The final phosphorus content was 6% by weight expressed as the pentoxide and which corresponded to a P/Mo atomic ratio of 0.85. Catalyst B obtained, the characteristics of which are shown in Table 1, was representative of industrial catalysts.

TABLE 1

Characteristics of NiMo catalysts A to H

| Catalyst | A | B | C | D | E | F | G | H |
|---|---|---|---|---|---|---|---|---|
| $MoO_3$ (wt %) | 14.5 | 14.5 | 14 | 14 | 13.5 | 14 | 14 | 13.5 |
| NiO (wt %) | 2.8 | 2.8 | 2.7 | 2.7 | 2.6 | 2.7 | 2.7 | 2.6 |
| $P_2O_5$ (wt %) | 0 | 6 | 0 | 0 | 0 | 5.8 | 5.8 | 5.6 |
| $B_2O_3$ (wt %) | 0 | 0 | 3.2 | 0 | 3.2 | 3.2 | 0 | 3.2 |
| $SiO_2$ (wt %) | 0 | 0 | 0 | 3.9 | 3.9 | 0 | 3.9 | 3.9 |
| $Al_2O_3$ (wt %) | 82.7 | 76.7 | 80.1 | 79.4 | 76.8 | 74.3 | 73.6 | 71.2 |
| B/Mo (at/at) | / | / | 0.94 | / | 0.98 | 0.94 | / | 0.98 |
| Si/Mo (at/at) | / | / | / | 0.66 | 0.69 | / | 0.66 | 0.69 |
| P/Mo (at/at) | / | 0.85 | / | / | / | 0.85 | 0.85 | 0.85 |
| Ni/Mo (at/at) | 0.37 | 0.37 | 0.37 | 0.37 | 0.37 | 0.37 | 0.37 | 0.37 |

Example 4
Preparation of NiMo/Alumina+B+Si Catalysts (in Accordance with the Invention)

Three catalysts C, D and E were prepared by dry impregnation of extrudates of the NiM1/alumina catalyst described in Example 2 (catalyst A) using solutions containing respectively ammonium biborate, Rhodorsil EP1 silicone emulsion and a mixture of the these two compounds. After ageing at ambient temperature in a water-saturated atmosphere, the impregnated extrudates were dried overnight at 120° C. then calcined at 550° C. for 2 hours in dry air. The characteristics of these three catalysts are shown in Table 1.

Example 5
Preparation of NiMoP/Alumina+B+Si Catalysts (in Accordance with the Invention)

Three samples of NiMoP/alumina catalyst (catalyst B) described in Example 3 were impregnated using the same solutions containing either B, or Si or B+Si, and using the same protocol as for the NiMo/alumina catalyst of Example 4. Thus catalyst F was prepared which had formula NiMoPB/alumina, catalyst G was prepared which had formula NiMoPSi/alumina and catalyst H was prepared which had the formula NiMoPBSi/alumina. The proportions of the various elements Ni, Mo, P, B and Si and the characteristics are shown in Table 1.

Example 6
Preparation of NiMoP/Alumina+F+B+Si Catalysts (in Accordance with the Invention)

Ammonium fluoride was added to an aqueous solution containing ammonium biborate and a Rhodorsil EPI silicone emulsion to obtain, by dry impregnation of extrudates of catalyst A, NiMo/alumina described in Example 2, a catalyst I with formula NiMoPBSi/alumina containing 1% by weight of fluorine and the proportions of Ni, Mo, B and Si shown in Table 1. The same steps of ageing, drying and calcining as described for the preparation of catalyst A of Example 2 were used.

In the same way and with the same solution, a volume of extrudates of catalyst B, NiMoP/alurnina, described in Example 3, was impregnated. Catalyst J thus obtained, with formula NiMoPBSi/alumina, contained 1% by weight of fluorine. The characteristics of the two catalysts I and J are shown in Table 2.

TABLE 2

Characteristics of NiMo catalysts I to S

| Catalyst | I | J | K | L | M | P | Q | R | S |
|---|---|---|---|---|---|---|---|---|---|
| $MoO_3$ (wt %) | 13.4 | 13.4 | 14 | 14 | 13.5 | 14.2 | 13.8 | 13.4 | 13.1 |
| NiO (wt %) | 2.6 | 2.6 | 2.7 | 2.7 | 2.6 | 2.8 | 2.75 | 2.7 | 2.6 |
| $P_2O_5$ (wt %) | 0 | 5.5 | 0 | 0 | 0 | 0 | 0 | 5.9 | 5.7 |
| $B_2O_3$ (wt %) | 3.2 | 3.2 | 3.2 | 0 | 3.2 | 0 | 3.2 | 0 | 3.1 |
| $SiO_2$ (wt %) | 3.9 | 3.9 | 0 | 3.9 | 3.9 | 4.3 | 4.2 | 4.1 | 4.0 |
| F (wt %) | 1 | 1 | 0 | 0 | 0 | 0 | 0 | 0 | 0 |
| $Al_2O_3$ (wt %) | 75.9 | 70.4 | 80.1 | 79.4 | 76.8 | 78.6 | 76.1 | 73.9 | 71.6 |
| B/Mo (at/at) | 0.98 | 0.98 | 0.94 | 0 | 0.98 | 0 | 0.95 | 0 | 0.98 |
| Si/Mo (at/at) | 0.69 | 0.69 | 0 | 0.66 | 0.69 | 0.73 | 0.73 | 0.73 | 0.73 |
| P/Mo (at/at) | 0 | 0.85 | 0 | 0 | 0 | 0 | 0 | 0.89 | 0.88 |
| F/Mo (at/at) | 0.57 | 0.57 | 0 | 0 | 0 | 0 | 0 | 0 | 0 |
| Ni/Mo (at/at) | 0.37 | 0.37 | 0.37 | 0.37 | 0.37 | 0.38 | 0.38 | 0.38 | 0.38 |

Example 7
Preparation of NiMo/Alumina B Catalysts (in Accordance with the Invention)

We dry impregnated three samples of the support of Example 1 using an aqueous solution containing ammonium biborate. After ageing at ambient temperature in a water-saturated atmosphere, the impregnated extrudates were dried overnight at 120° C. then calcined at 550° C. for 2 hours in dry air. The boron-doped alumina extrudates obtained were then impregnated with a solution containing ammonium heptamolybdate $Mo_7O_{24}(NH_4)_6.4H_2O$, and nickel nitrate $Ni(NO_3)_2.6H_2O$. After ageing, drying and calcining at 550° C. as before, catalyst K was obtained: NiMo/alumina doped with boron. The final contents of Mo, Ni and B corresponded to that of catalyst C described in Example 4.

Catalyst L was obtained using the same procedure a catalyst K above but replacing the boron impregnation solution with Rhodorsil EP1 silicone emulsion. The catalyst obtained: NiMo/alumina doped with silicon, had the same composition by weight as catalyst D described in Example 4.

Finally, a catalyst M was obtained using the same procedure as for catalyst K above but using an aqueous solution containing ammonium biborate and Rhodorsil EP1 silicone emulsion. The final Mo, Ni, B and Si contents of catalyst M were the same as those of catalyst E described in Example 4. The characteristics of catalysts K, L and M are shown in Table 2.

Example 8
Preparation of Silica-Alumina Support

We produced a silica-alumina support by co-precipitation. After co-precipitation, the solid was filtered, dried for 4 hours at 120° C. in dry air. A gel was thus obtained which was mixed with an aqueous solution containing 66% nitric acid (7% by weight of acid per gram of dry gel) then mixed for 15 minutes. Following mixing, the paste obtained was passed through a die with cylindrical orifices with a diameter of 1.3 mm. The extrudates were dried overnight at 120° C. then calcined at 550° C. for 2 hours in moist air containing 7.5% by volume of water. 1.2 mm diameter cylindrical extrudates were obtained which had a specific surface area of 223 m$^2$/g, a pore volume of 0.51 cm$^3$/g and a monomodal pore size distribution centered on 9 nm. The composition of these extrudates was 5.2% by weight of $SiO_2$ and 94.8% by weight of $Al_2O_3$.

Example 9
Preparation of Catalysts Supported on Silica-Alumina

We dry impregnated the extruded support of Example 8 with an aqueous solution comprising salts of molybdenum and nickel. The molybdenum salt was ammonium heptamolybdate $Mo_7O_{24}(NH_4)_6 \cdot 4H_2O$, and the nickel salt was nickel nitrate $Ni(NO_3)_2 \cdot 6H_2O$. After ageing at ambient temperature in a water-saturated atmosphere, the impregnated extrudates were dried overnight at 120° C. then calcined at 550° C. for 2 hours in dry air. Catalyst P obtained, the characteristics of which are shown in Table 2, was representative of industrial catalysts.

In the same manner, we dry impregnated the extruded support of Example 8 with an aqueous solution comprising salts of molybdenum, nickel and phosphorus. The molybdenum salt was ammonium heptamolybdate $Mo_7O_{24}(NH_4)_6 \cdot 4H_2O$, the nickel salt was nickel nitrate $Ni(NO_3)_2 \cdot 6H_2O$, a phosphorus was added in the form of phosphoric acid. After ageing at ambient temperature in a water-saturated atmosphere, the impregnated extrudates were dried overnight at 120° C. then calcined at 550° C. for 2 hours in dry air. Catalyst R obtained, the characteristics of which are shown in Table 2, was representative of industrial catalysts.

Example 10
Preparation of NiMo/Silica-Alumina Catalysts Containing Boron

We dry impregnated catalyst P obtained from Example 9 with an aqueous solution containing ammonium biborate. After ageing at ambient temperature in a water-saturated atmosphere, the impregnated extrudates were dried overnight at 120° C. then calcined at 550° C. for 2 hours in dry air. Catalyst Q was obtained, the characteristics of which are shown in Table 2.

We dry impregnated catalyst R obtained from Example 9 with an aqueous solution containing ammonium biborate. After ageing at ambient temperature in a water-saturated atmosphere, the impregnated extrudates were dried overnight at 120° C. then calcined at 550° C. for 2 hours in dry air. Catalyst S was obtained, the characteristics of which are shown in Table 2.

Example 11
Hydrogenation and Acidity Tests on Model Molecules: Hydrogenation of Toluene, Isomerisation of Cyclohexane Catalysts A to S described above were dynamically sulfurised in situ in a fixed traversed bed tube reactor in a Catatest type pilot unit (constructed by Géoméchanique), with the fluids circulating from top to bottom. Measurements of hydrogenating and isomerising activity were carried out immediately after sulfurisation under pressure without ingress of air, using the hydrocarbon feed which was employed to sulfurise the catalysts.

The sulfurisation and test feed was composed of 5.8% by weight of dimethyldisulfide (DMDS), 20% by weight of toluene and 74.2% by weight of cyclohexane. The stabilised catalytic activities of equal volumes of catalysts A to S was measured for the hydrogenation of toluene. Tracking the isomerisation of cyclohexane, a diluent of toluene, allowed the acidity of the catalysts to be evaluated.

| | |
|---|---|
| Total pressure | 6.0 MPa; |
| Pressure of toluene | 0.38 MPa; |
| Pressure of cyclohexane | 1.55 MPa; |
| Pressure of hydrogen | 3.64 MPa; |
| Pressure of $H_2S$ | 0.22 MPa; |
| Volume of catalyst | 40 cc; |
| Charge flow rate | 80 cc/h; |
| Hourly space velocity | 2 l/h/h$^{-1}$; |
| Hydrogen flow rate | 36 l/h; |
| Sulphurisation and test temperature | 350° C. (3° C./min). |

Liquid effluent was removed and analysed using gas phase chromatography. Determination of the molar concentration of unconverted toluene (T) and the concentrations of the hydrogenation products: methylcyclohexane (MCC6), ethylcyclopentane (EtCC5) and dimethylcyclopentane (DMCC5) allowed the toluene hydrogenation yield $X_{HYD}$ to be calculated, defined as:

$$X_{HYD}(\%) = 100 * \frac{(MCCC6 + EtCC5 + DMCC5)}{(T + MCC6 + EtCC5 + DMCC5)}$$

The degree of isomerization of cyclohexane $X_{ISO}$ was calculated in the same way from the concentrations of unconverted cyclohexane and its reaction product, methylcyclopentane.

The toluene hydrogenation reaction and cyclohexane isomerisation being first order under our test conditions and the reactor behaving as an ideal piston reactor, the hydrogenating reactivity $A_{HYD}$ and isomerising activity $A_{ISO}$ of the catalysts was calculated by applying the formula:

$$Ai = \ln(100/(100 - X_i))$$

Table 3 compares the relative hydrogenating and isomerising activities, equal to the ratio of the activity of the catalyst under consideration over the activity of catalyst A taken as a reference.

TABLE 3

Relative hydrogenation and isomerisation activities for NiMo catalysts A to S

| Catalyst | Formula | $A_{HYD}$ relative to A | $A_{ISO}$ relative to A |
|---|---|---|---|
| A | NiMo/alumina | 1 | 1 |
| B | NiMoP/alumina | 1.52 | 1.7 |
| C | NiMoB/alumina | 1.48 | 4.0 |
| D | NiMoSi/alumina | 1.22 | 11.3 |
| E | NiMoBSi/alumina | 1.71 | 17.7 |
| F | NiMoPB/alumina | 1.82 | 9.5 |
| G | NiMoPSi/alumina | 1.36 | 14.6 |
| H | NiMoPBSi/alumina | 2.05 | 24.7 |
| I | NiMoFBSi/alumina | 2.13 | 20.9 |
| J | NiMoPFBSi/alumina | 1.91 | 21.8 |
| K | NiMo/alumina-B | 0.95 | 1.9 |
| L | NiMo/alumina-Si | 0.5 | 10.2 |

TABLE 3-continued

Relative hydrogenation and isomerisation activities for NiMo catalysts A to S

| Catalyst | Formula | $A_{HYD}$ relative to A | $A_{ISO}$ relative to A |
|---|---|---|---|
| M | NiMo/alumina-BSi | 0.6 | 12.3 |
| P | NiMo/silica-alumina | 0.8 | 7.4 |
| Q | NiMoB/silica-alumina | 0.95 | 14.2 |
| R | NiMoP/silica-alumina | 1.2 | 9.8 |
| S | NiMoPB/silica-alumina | 1.4 | 14.6 |

Table 3 shows the improvement of catalysts E, H, I and J for which both boron and silicon have been added to the catalyst. This combination of B and Si reinforces both the hydrogenating activity and the acidity of the catalyst. Addition of boron (catalysts C and F) or silicon (catalysts D and G) alone does not improve both the hydrogenating function and the acid function of the catalyst. Catalysts K, L and M, in which B, Si and B+Si have been respectively introduced with the alumina before deposition of the active NiMo phase, are less active in hydrogenation than their homologues C, D and E. Similarly, the acidity of catalysts K, L and M indicated by their isomerizing activity is improved with respect to catalyst A but remains inferior to the isomerizing activity of their homologues, catalysts C, D and E. Table 3 thus shows that the silicon, the boron or silicon and boron must be incorporated after deposition of the active phase (catalysts C, D and E) and not before (catalysts K, L and M) in order to obtain simultaneous reinforcement of the hydrogenating activity and the isomerizing activity, i.e., the acidity.

Table 3 also shows the importance of introducing silica into a catalyst which has already been produced and the advantage of using this preparation method rather than starting from a silica-alumina based support. Thus the catalysts of Example 9 based on silica-alumina containing boron, such as catalyst Q, have a composition which is very close to the composition of catalyst E but a substantially lower hydrogenating activity. The level of isomerizing activity of catalyst Q is high but a little lower than that of catalyst H. The same result is shown for catalysts S and H which also contain phosphorus. This is due to the formation of an active phase which is not as good on a silica-alumina support as on alumina, a fact which is well known to the skilled person. Addition of boron thus has a lower effect on a catalyst containing a silica-alumina support than joint addition of boron and silica to a catalyst with an alumina support.

Example 12
Vacuum Distillate Hydrotreated Test

Catalysts A, B, F, H and S described above were also compared in a hydrotreated test for a vacuum distillate, the principal characteristics of which are given in the following table:

| Density at 15° C. | 0.938 |
|---|---|
| Sulphur | 3.12% by weight |
| Total nitrogen | 1050 ppm by weight |
| Simulated distillation | |
| IP | 345° C. |
| 10% | 412° C. |
| 50% | 488° C. |
| 90% | 564° C. |
| EP | 615° C. |

The test was carried out in an isothermal fixed traversed bed pilot reactor, with the fluids circulating from bottom to top. After sulfurising in situ at 350° C. in a pressurised unit using a straight run gas oil to which 2% by weight of dimethylsulfide had been added, the hydrotreated test was carried out under the following operating conditions:

| Total pressure | 12 MPa; |
|---|---|
| Volume of catalyst | 40 cm³; |
| Temperature | 380° C. |
| Hydrogen flow rate | 24 l/h; |
| Feed flow rate | 20 cm³/h |

The catalytic performances of the catalysts tested are shown in Table 4 below. They are expressed as the relative activity, assuming that that of catalyst A is equal to 1 and considering that they are of order 1.5. The relation connecting activity and hydrodesulfuration conversion (% HDS) is as follows:

$$A_{HDS} = \left[\frac{100}{100 - \%HDS}\right]^{0.5} - 1$$

The same relationship is applicable to hydrodenitrogenation (% HDN and $A_{HDN}$).

Further, the net conversion of the fraction of the feed having a boiling point of more than 380° C. (% 380° C.⁺by weight) obtained with each catalyst was evaluated. It is expressed from the simulated distillation results (ASTM method D86) by the relationship:

$$\text{Conv } 380° \text{ C.}^+ = \frac{(\% \ 380° \text{ C.}^+)\text{test} - (\% \ 380° \text{ C.}^+)\text{feed}}{(\% \ 380° \text{ C.}^+)\text{feed}}$$

TABLE 8

Vacuum distillate hydrotreatment activity of catalysts

| Catalyst | $A_{HDS}$ relative to A | $A_{HDN}$ relative to A | Conv 380° C.⁺ (%) |
|---|---|---|---|
| A (NiMo/alumina) | 1 | 1 | 30 |
| B (NiMoP/alumina) | 1.1 | 1.3 | 33 |
| F (NiMoPB/alumina) | 1.15 | 1.5 | 37 |
| H (NiMoPBSi/alumina) | 1.2 | 1.6 | 40 |
| S (NiMoPB/silica-alumina) | 1.1 | 1.5 | 39 |

The results in Table 8 indicate that adding boron and silicon to a catalyst containing a group VIB element and at least one non noble group III element supported on an amorphous oxide matrix obtained using the methods of the invention substantially improve the performances of the catalyst for hydrodesulfuration, hydrodenitrogenation and conversion of the 380° C.+ fraction to a light cut boiling at a temperature of less than 380° C. It can also be seen that catalyst S, with a composition which is very similar to that of catalyst H, obtained by adding B to a catalyst R containing a NiMo phase on a silica-alumina and containing P, is not as good in HDS, HDN and conversion as catalyst H. This is due to poorer dispersion of the active NiMo phase on a silica-alumina support than on an alumina support, as is well known to the skilled person.

Catalyst H containing boron and silicon is thus of particular importance for use in hydrotreated processes which pre-treat vacuum distillate type hydrocracking feeds since the improved hydrodenitrogenation activity means that a hydrocracking feed can be produced with a lower nitrogen content.

Catalyst H containing boron and silicon is also of particular importance for use in hydrotreated processes for pre-treating vacuum distillate type catalytic cracking feeds since the improved hydrodesulfuration, hydrodenitrogenation and conversion activity mean that a more reactive catalytic cracking feed can be produced.

Catalyst H containing boron and silicon is also of particular importance for use in a hydrorefining process since the improved hydrodesulfuration, hydrodenitrogenation and conversion activity means that technical or medicinal oils can be produced to specifications.

Example 13
Preparation of CoMo/Alumina Catalyst Precursor

We dry impregnated the extruded support of Example 1 with an aqueous solution comprising salts of molybdenum and cobalt. The molybdenum salt was ammonium heptamolybdate $Mo_7O_{24}(NH_4)_6 \cdot 4H_2O$, and the cobalt salt was cobalt nitrate $Co(NO_3)_2 \cdot 6H_2O$. After ageing at ambient temperature in a water-saturated atmosphere, the impregnated extrudates were dried overnight at 120° C. then calcined at 550° C. for 2 hours in dry air. Catalyst ACo obtained, the characteristics of which are shown in Table 9, was representative of industrial catalysts.

Example 14
Preparation of CoMoP/Alumina Catalyst Precursor

We dry impregnated the extruded support of Example 1 with an aqueous solution containing the same salts as the solution used to prepare catalyst ACo of Example 13, but to which phosphoric acid $H_3PO_4$ had been added. The same steps of ageing, drying and calcining as those used to prepare catalyst ACo of Example 13 were used. Catalyst BCo obtained, the characteristics of which are shown in Table 9, was representative of industrial catalysts.

TABLE 9

Characteristics of CoMo catalysts

| Catalyst | ACo | BCo | ECo | HCo |
|---|---|---|---|---|
| $MoO_3$ (wt %) | 14.4 | 13.6 | 12.2 | 9.7 |
| CoO (wt %) | 3.2 | 3.02 | 2.7 | 2.15 |
| $P_2O_5$ (wt %) | 0 | 6 | 0 | 5.56 |
| $B_2O_3$ (wt %) | 0 | 0 | 1.25 | 1.12 |
| $SiO_2$ (wt %) | 0 | 0 | 2.52 | 2.57 |
| $Al_2O_3$ (wt %) | 82.4 | 77.4 | 81.3 | 78.9 |
| B/Mo (at/at) | / | / | 0.42 | 0.48 |
| Si/Mo (at/at) | / | / | 0.50 | 0.64 |
| P/Mo (at/at) | / | 0.90 | / | 1.17 |
| Co/Mo (at/at) | 0.43 | 0.43 | 0.43 | 0.43 |

Example 15
Preparation of CoMo/Alumina+B+Si Catalysts (in Accordance with the Invention)

A catalyst ECo was prepared by dry impregnation of extrudates of the CoMo/alumina catalyst described in Example 13 (catalyst ACo) using a solution containing a mixture of ammonium biborate and Rhodorsil EP1 silicone emulsion. After ageing at ambient temperature in a water-saturated atmosphere, the impregnated extrudates were dried overnight at 120° C. then calcined at 550° C. for 2 hours in dry air. The characteristics of this catalyst are shown in Table 9.

Example 16
Preparation of CoMoP/Alumina+B+Si catalysts (in Accordance with the Invention)

A sample of CoMoP/alumina catalyst (catalyst BCo) described in Example 14 was impregnated using the same solutions containing B+Si, and using the same protocol as for the CoMo/alumina catalyst of Example 15. Thus catalyst HCo was prepared which had the formula CoMoPBSi/alumina. The proportions of the various elements Co, Mo, P, B and Si and the characteristics are shown in Table 9.

Example 17
Preparation of CoMoP/Alumina+F+B+Si Catalysts (in Accordance with the Invention)

Ammonium fluoride was added to an aqueous solution containing ammonium biborate and a Rhodorsil EP1 silicone emulsion to obtain, by dry impregnation of extrudates of catalyst ACo, the CoMo/alumina described in Example 13, a catalyst ICo with formula CoMoPBSi/alumina containing the proportions of Co, Mo, B and Si shown in Table 10. The same steps of ageing, drying and calcining as described for the preparation of the catalyst of Example 15 were used.

In the same way and with the same solution, a volume of extrudates of catalyst BCo, CoMoP/alumina, described in Example 14, was impregnated. Catalyst JCo was thus obtained, with formula CoMoPBSi/alumina. The characteristics of the two catalysts ICo and JCo are shown in Table 10.

TABLE 10

Characteristics of CoMo catalysts ICo and JCo

| Catalyst | ICo | JCo |
|---|---|---|
| $MoO_3$ (wt %) | 9.22 | 8.35 |
| CoO (wt %) | 2.05 | 1.85 |
| $P_2O_5$ (wt %) | 0 | 5.5 |
| $B_2O_3$ (wt %) | 1.23 | 1.14 |
| $SiO_2$ (wt %) | 2.72 | 2.67 |
| F (wt %) | 1.05 | 1.12 |
| $Al_2O_3$ (wt %) | 83.7 | 71.3 |
| B/Mo (at/at) | 0.55 | 0.57 |
| Si/Mo (at/at) | 0.71 | 0.77 |
| P/Mo (at/at) | / | 1.24 |
| F/Mo (at/at) | 0.55 | 0.57 |
| Co/Mo (at/at) | 0.43 | 0.43 |

EXAMPLE 18
Gas oil hydrodesulfuration tests

The supported catalysts described in Examples 13 to 17 were compared in a gas oil hydrodesulfuration test in a fixed bed pilot unit operating in upflow mode, i.e., the feed circulated from bottom to top. The principal characteristics of the feed are given in the following table:

| | |
|---|---|
| Density at 15° C. | 0.856 |
| Refractive index at 20° C. | 1.4564 |
| Viscosity at 50° C. | 3.72 cSt |
| Sulphur | 1.57% by weight |

-continued

| Simulated distillation | |
|---|---|
| IP | 153° C. |
| 10% | 222° C. |
| 50% | 315° C. |
| 95% | 415° C. |
| EP | 448° C. |

The gas oil HDS test was carried out under the following operating conditions:

| Total pressure | 3 MPa; |
|---|---|
| Volume of catalyst | 40 cm³; |
| Temperature | 340° C. |
| Hydrogen flow rate | 20 l/h; |
| Feed flow rate | 80 cm³/h |

Each catalyst was sulfurised before the test at 350° C., and at a total pressure of 3 MPa using the gas oil described above to which 2% by weight of dimethyldisulfide (DMDS) had been added.

The catalytic performances of the catalysts tested are shown in Table 11 below. The activity was calculated by assuming that the reaction was of order 1.5. The relationship connecting activity and conversion (% HDS) is thus as follows:

$$A_{HDS} = \left[\frac{100}{100-\%HDS}\right]^{0.5} - 1 \quad \text{where:} \quad \%HDS = 100\frac{[S_{feed}-S_{effluent}]}{S_{effluent}}$$

In Table 11, the activities are shown as the relative activity, assuming that of catalyst ACo to be equal to 1.

TABLE 11

| Gas oil hydrodesulphuration activity of catalysts | | |
|---|---|---|
| Catalyst | | Activity relative to ACo |
| ACo | CoMo | 1 |
| BCo | CoMoP | 1.15 |
| ECo | CoMoBSi | 1.5 |
| HCo | CoMoPBSi | 1.22 |
| ICo | CoMoBSiF | 1.95 |
| JCo | CoMoPBSiF | 1.48 |

It can be seen from Table 11 that the gas oil hydrodesulfuration of catalysts containing both boron and silicon is in each case superior to the performances of catalysts not containing these two elements. There is thus an advantage in combining boron and silicon. This advantage is substantial when the catalyst contains P (HCo and JCo) but it is even greater when the catalyst does not contain P (ECo and ICo). In all cases the presence of fluorine further increases the hydrodesulfuration activity, and here again, the results are better in the absence of phosphorus.

The results of Table 11 thus indicate that adding boron and silicon to a catalyst containing both a group VI element and at least one non noble group VIII element supported on an amorphous oxide matrix obtained using the methods of the invention substantially increase the performances of the catalyst as regards hydrodesulfuration of gas oil cuts.

Example 19

Gas Oil Aromatic Compound Hydrogenation Tests

The supported NiMo type catalysts A, B, F and H prepared as described in Examples 2, 3 and 5 were compared in a gas oil aromatic compound hydrogenation test. The test feed was a fluid catalytic cracking or LCO gas oil which had been desulfurised so that it only contained a small quantity of sulfur. The principal characteristics of the desulfurised gas oil are given in the following table:

| Density at 20° C. | 0.904 |
|---|---|
| Sulphur (ppm) | 109 |
| Nitrogen (ppm) | 132 |
| D86 (° C.) | |
| IP | 166° C. |
| 10% | 210° C. |
| 50% | 266° C. |
| 90% | 343° C. |
| EP | 415° C. |
| Aromatics (% by weight) | |
| Total | 74 |
| Mono | 44 |
| Di | 27 |
| Tri | 3 |
| AC by NMR | 43 |

It should be noted from this table that the desulfurised gas oil contained only 109 ppm of sulfur, a large quantity of nitrogen, 132 ppm, and a very large quantity of aromatic compounds.

The gas oil HDS test was carried out in a fixed bed pilot unit operating in upflow mode, i.e., the feed circulated from bottom to top, under the following operating conditions:

| Total pressure | 9 MPa; |
|---|---|
| Volume of catalyst | 40 cm³; |
| Temperature | 340° C. |
| Hydrogen flow rate | 40 l/h; |
| Feed flow rate | 40 cm³/h |

Each catalyst was sulfurised before the test at 350° C., and at a total pressure of 9 MPa using the gas oil described above to which 2% by weight of dimethyldisulfide (DMDS) had been added.

The catalytic performances of the catalysts tested are shown in Table 12 below. For each experiment, we measured the density of the liquid effluent at 20° C., the AC content (Aromatic Carbon measured by NMR) of the effluent and the initial content of the feed, $AC_0$. From the AC of the feed and the AC of the effluent, we calculated the aromatic compound conversion (% HAR) then the hydrogenating activity assuming it was of order 1.

$$A_{HAR} = Ln\left[\frac{100}{100-\%HAR}\right]$$

We also determined the hydrodesulfuration activity. The activity was calculated by assuming that the reaction was of order 1.5. The relationship between activity and conversion (% HDS) was thus as follows:

$$A_{HDS} = \left[\frac{100}{100-\%HDS}\right]^{0.5} - 1$$

We also determined the hydrodenitrogenation activity. The activity was calculated by assuming that the reaction was of order 1. The relationship between activity and conversion of the nitrogen-containing product (% HDN) was thus as follows:

$$A_{HDN} = \text{Ln}\left[\frac{100}{100 - \%HDN}\right]$$

In Table 12, the activities are shown as the relative activity, assuming that of catalyst A to be equal to 1.

TABLE 12

Aromatic compound hydrogenation activity for catalysts for a desulphurised gas oil

| Catalyst | $A_{HDS}$ relative to catalyst A | $A_{HDN}$ relative to catalyst A | $A_{HAR}$ relative to catalyst A |
|---|---|---|---|
| A (NiMo/alumina) | 1 | 1 | 1 |
| B (NiMoP/alumina) | 1.12 | 1.22 | 1.25 |
| F (NiMoPB/alumina) | 1.08 | 1.52 | 1.57 |
| H (NiMoPBSi/alumina) | 1.05 | 1.71 | 1.68 |

The results of Table 12 indicate that adding boron and silicon to a catalyst containing a group VIB element and at least one non noble group III element supported on an amorphous oxide matrix obtained using the methods of the invention substantially improves the performances of the catalyst for hydrogenation of aromatic compounds in a desulfurised LCO type gas oil. It can also be seen that the desulfurization and hydrodenitrogenation performances are also improved.

Catalyst H containing boron and silicon is thus of particular importance for use in processes for hydrotreating distillate type feeds which have been desulfurised to a S content of below 700 ppm either to reduce the sulfur content or to reduce the nitrogen content or to reduce the aromatic compound content.

Example 20

Partial Hydrocracking Tests on a Vacuum Distillate

Catalysts A, B, F and H prepared as described in Examples 2, 3 and 5 were used under mild hydrocracking conditions on a vacuum distillate type petroleum feed containing a large amount of sulfur and nitrogen which had the following principal characteristics:

| Density at 15° C. | 0.921 |
| Sulphur | 2.46% by weight |
| Total nitrogen | 1130 ppm by weight |
| Simulated distillation | |
| IP | 365° C. |
| 10% | 430° C. |
| 50% | 472° C. |
| 90% | 504° C. |
| EP | 539° C. |

The catalytic test unit comprised a fixed bed reactor in upflow mode. The partial hydrocracking test was carried out under the following operating conditions:

| Total pressure | 5 MPa; |
| Volume of catalyst | 40 cm³; |
| Temperature | 380° C. to 420° C. |
| Hydrogen flow rate | 10 l/h; |
| Feed flow rate | 20 cm³/h |

Each catalyst was sulfurised before the test at 350° C., and at a total pressure of 5 MPa using the gas oil described in Example 15 to which 2% by weight of dimethyldisulfide (DMDS) had been added.

Catalytic performances are expressed as the crude conversion at 400° C. (CC), the crude middle distillate selectivity (CS) and by hydrodesulfuration (HDS) and hydrodenitrogenation (HDN) conversions. These catalytic performances were measured on the catalyst after a period of stabilisation had passed, generally at least 48 hours.

The crude conversion CC is taken to be:

CC=% by weight of 380° C.$^{minus}$ in effluent

The crude selectivity CS for middle distillates is taken to be:

CS=100×weight of (150° C.–380° C.) fraction/weight of 380° C.$^{minus}$ fraction of effluent The hydrodesulfuration conversion HDS is taken to be:

HDS=$(S_{initial}-S_{effluent})/S_{initial}\times 100=(24600-S_{effluent})/24600\times 100$ The hydrodenitrogenation conversion HDN is taken to be:

HDN=$(N_{initial}-N_{effluent})/N_{initial}\times 100=(1130-N_{effluent})/1130\times 100$ In Table 13 below, we show the crude conversion CC at 400° C., the crude selectivity CS, the hydrodesulfuration conversion HDS and the hydrodenitrogenation conversion HDN for catalysts tested under these conditions.

TABLE 13

Catalyst activity for mild hydrocracking of a vacuum distillate

| | | CC (wt %) | CS (%) | HDS (%) | HDN (%) |
|---|---|---|---|---|---|
| A | NiMo/alumina | 38.2 | 82.6 | 97.6 | 90.3 |
| B | NiMoP/alumina | 40.2 | 82.5 | 98.2 | 92.4 |
| F | NiMoPB/alumina | 41.3 | 82.5 | 97.9 | 93.3 |
| H | NiMoPBSi/alumina | 42.3 | 82.6 | 98.5 | 93.9 |

The results of Table 13 indicate that adding boron and silicon to a catalyst containing a group VIB element and at least one non noble group VIII element supported on an amorphous oxide matrix obtained using the methods of the invention substantially improves the performances of the catalyst for conversion of the 380° C. plus fraction to a 380° C. minus fraction, which is difficult to carry out on this type of feed with a high sulfur content. Table 13 also shows that the crude selectivity remained equivalent.

Catalyst H containing boron and silicon is thus of particular importance for use in hydrotreated processes converting vacuum distillate feeds with a high sulfur and nitrogen content, the process generally being known as mild or partial hydrocracking, at a moderate hydrogen pressure.

Example 21

High Conversion Vacuum Distillate Hydrocracking Tests

Catalysts A, B, F and H prepared as described in Examples 2, 3 and 5 were used under high conversion (60–100%) hydrocracking conditions on a vacuum distillate type petroleum feed containing a large quantity of sulfur and nitrogen and which had the following principal characteristics:

| | |
|---|---|
| Density at 15° C. | 0.912 |
| Sulphur | 2.22% |
| Total nitrogen | 598 ppm by weight |
| Simulated distillation | |
| IP | 345° C. |
| 10% | 375° C. |
| 50% | 402° C. |
| 90% | 428° C. |
| EP | 467° C. |

The catalytic test unit comprised a fixed bed reactor in upflow mode. The partial hydrocracking test was carried out under the following operating conditions:

| | |
|---|---|
| Total pressure | 20 MPa; |
| Volume of catalyst | 40 cm³; |
| Temperature | 380° C. to 420° C. |
| Hydrogen flow rate | 24 l/h; |
| Feed flow rate | 26 cm³/h |

Each catalyst was sulfurized before the test at 350° C., and at a total pressure of 20 MPa using the feed to which 2% by weight of dimethyldisulfide (DMDS) had been added.

Under these conditions, catalytic performances for hydrodesulfuration (HDS) and hydrodenitrogenation (HDN) were such that the sulfur contents (S<10 ppm) and nitrogen (N<2 ppm) in the effluent were below the limit of detection of standard analysis techniques. This observation is normal bearing in mind the high hydrogen pressure employed. Of greatest interest is the conversion activity of the 380° C.$^{plus}$ fraction, i.e., the crude conversion (CC). These catalytic performances were measured on the catalyst after a period of stabilisation had passed, generally at least 48 hours.

The crude conversion CC is taken to be:

CC=% by weight of 380°C.$^{minus}$ in effluent

Table 14 below shows the crude conversion CC at 410° C. for catalysts tested under these conditions.

TABLE 14

Catalyst activity for high pressure hydrocracking of a vacuum distillate

| | | CC (wt %) |
|---|---|---|
| A | NiMo/alumina | 65.2 |
| B | NiMoP/alumina | 70.4 |
| F | NiMoPB/alumina | 75.2 |
| H | NiMoPBSi/alumina | 83.1 |

The results of Table 14 indicate that adding boron and silicon to a catalyst containing a group VIB element and at least one non noble group VIII element supported on an amorphous oxide matrix obtained using the methods of the invention substantially improves the performances of the catalyst for conversion of the 380° C. plus fraction to a 380° C. minus fraction, which is difficult to carry out on this type of feed with a high sulfur content.

Catalyst H containing boron and silicon is thus of particular importance for use in processes for hydrocracking vacuum distillate feeds with a high sulfur and nitrogen content, generally known as hydrocracking, using an amorphous catalyst at a high hydrogen pressure.

Example 22
Gasoline Hydrodesulfuration Tests

The supported CoMo catalysts described in Examples 10 to 14 were compared in a gasoline hydrodesulfuration test in a fixed bed pilot unit operating in upflow mode, i.e., the feed circulated from bottom to top. The principal characteristics of the feed are given in the following table:

| | |
|---|---|
| Density at 22° C. | 0.735 |
| Sulfur | 230 ppm |
| S mercaptans | 69 ppm |
| Olefins (GC) | 26.8% by weight |
| Diolefins (GC) | 1.15% by weight |
| Bromine number (g/100 g) | 47 |
| Stimulated distillation | |
| IP | 53° C. |
| EP | 168° C. |

The gasoline HDS test was carried out under the following operating conditions:

| | |
|---|---|
| Total pressure | 6 MPa; |
| Volume of catalyst | 25 cm³; |
| Temperature | 250° C. |
| Hydrogen flow rate | 60 Nl/h; |
| Feed flow rate | 200 cm³/h |

Each catalyst was sulfurized for 4 hours at 350° C. before the test, and at a total pressure of 6 MPa using a mixture containing 2% by weight of dimethyldisulfide (DMDS) in n-heptane with a HSV of 1 h$^{-1}$ and a hydrogen flow rate of 350 Nl per liter of feed.

The catalytic performances of the tested catalysts are shown in Table 15 below. Performance is indicated by the amount of sulfur removed.

TABLE 15

Gasoline hydrodesulphuration activity of catalysts

| Catalyst | | % S removed |
|---|---|---|
| ACo | CoMo | 87.2 |
| BCo | CoMoP | 88.3 |
| ECo | CoMoBSI | 90.9 |
| HCo | CoMoPBSi | 89.5 |
| ICo | CoMoBSiF | 91.4 |
| JCo | CoMoPBSiF | 91.9 |

It can be seen from Table 15 that the gasoline hydrodesulfuration performance of catalysts containing both boron and silicon is in each case superior to the performances of catalysts not containing these two elements. There is thus an advantage in combining boron and silicon. This advantage is substantial when the catalyst contains P (HCo and JCo) but it is even greater when the catalyst does not contain P (ECo and ICo). In all cases the presence of fluorine further increases the hydrodesulfuration activity, and here again, the results are better in the absence of phosphorus.

The results of Table 15 thus indicate that adding boron and silicon to a catalyst containing both a group VIB element and at least one non noble group VIII element supported on an amorphous oxide matrix obtained using the methods of the invention substantially increase the performances of the catalyst as regards hydrodesulfuration of gasolines.

We claim:

1. A catalyst comprising at least one metal from Group VIB of the periodic table and at least one metal from Group VIII of the periodic table, said metals being deposited on a support, said catalyst further comprising silicon and boron deposited on a precatalyst containing said Group VIB and VIII metals.

2. A catalyst according to claim 1, further comprising phosphorus.

3. A catalyst according to claim 1, further comprising a halogen.

4. A catalyst according to claim 3, in which the halogen is flourine.

5. A catalyst according to claim 1 comprising, by weight with respect to the total catalyst mass:

3% to 60% of a Group VIB metal;

at most 30% of a Group VIII metal;

at least one amorphous or low crystallinity support;

0.1% to 20% or boron;

0.1% to 20% of silicon;

0 to 20% of phosphorus;

0 to 20% of at least one Group VIIA element.

6. A catalyst according to claim 5, comprising 3% to 45% by weight of a Group VIB metal.

7. A catalyst according to claim 5, in which the catalyst comprises 0.1% to 25% by weight of a Group VIII metal.

8. A catalyst according to claim 1, in which the boron content is 0.1% to 15% by weight, and the silicon content is in the range 0.1% to 15% by weight.

9. A catalyst according to claim 1, further comprising 0.1% to 20% by weight of phosphorus.

10. A catalyst according to claim 9, further comprising 0.1% to 15% by weight, of phosphorus.

11. A catalyst according to claim 1, comprising 0.1% to 20% by weight of a halogen.

12. A catalyst according to claims 1, comprising 0.1% to 20% of fluorine.

13. A process for the production of a catalyst comprising at least one metal from Group VIB of the periodic table and at least one metal from Group VIII of the periodic table, said metals being deposited on a support, said catalyst further comprising silicon and boron deposited on a precatalyst containing said Group VIB and VIII metals, comprising introducing at least one solution containing boron and at least one solution containing silicon singly or together into a catalyst precursor comprising a porous amorphous matrix comprising at least one Group VIB metal and at least one Group VIII metal, and optionally phosphorus.

14. A process for the production of a catalyst comprising at least one metal from Group VIB of the periodic table and at least one metal from Group VIII of the periodic table, said metals being deposited on a support, said catalyst further comprising silicon and boron deposited on a precatalyst containing said Group VIB and VIII metals, comprising introducing at least one aqueous solution containing boron and at least one aqueous solution containing silicon singly or together into a catalyst precursor comprising a porous amorphous matrix comprising at least one Group VIB metal and at least one Group VIII metal, and optionally phosphorus.

* * * * *